United States Patent [19]

Rachel

[11] E Patent Number: Re. 31,658

[45] Reissued Date of Patent: Sep. 4, 1984

[54] FUEL INJECTION SYSTEM

[75] Inventor: Todd L. Rachel, Rochester, Mich.

[73] Assignee: The Bendix Corporation, Southfield, Mich.

[21] Appl. No.: 111,640

[22] Filed: Jan. 14, 1980

Related U.S. Patent Documents

Reissue of:

[64] Patent No.: 3,763,833
Issued: Oct. 9, 1973
Appl. No.: 144,268
Filed: May 17, 1971

U.S. Applications:

[63] Continuation of Ser. No. 457,148, Apr. 1, 1974, abandoned, and a continuation-in-part of Ser. No. 815,800, Apr. 14, 1969, abandoned.

[51] Int. Cl.[3] ..... F02D 5/00

[52] U.S. Cl. ..... 123/488; 123/490; 307/273; 307/445; 307/599; 307/268

[58] Field of Search ..... 123/32 AE, 32 EA, 119; 307/268, 273, 440, 445, 599

[56] References Cited

U.S. PATENT DOCUMENTS

| | | | |
|---|---|---|---|
| 2,867,200 | 1/1959 | Gryder et al. | 123/179 B |
| 3,270,266 | 8/1966 | Bryan et al. | 307/268 X |
| 3,320,434 | 5/1967 | Ott | 307/268 |
| 3,338,221 | 8/1967 | Scholl | 123/119 X |
| 3,353,034 | 11/1967 | Betz | 307/273 X |
| 3,390,283 | 6/1968 | Hannigsberg | 307/268 |
| 3,430,616 | 3/1969 | Glockler et al. | 123/119 |
| 3,456,628 | 7/1969 | Bassot et al. | 123/32 EA |
| 3,483,851 | 12/1969 | Reichardt | 123/32 EA |

*Primary Examiner*—Larry N. Anagnos
*Attorney, Agent, or Firm*—Markell Seitzman

[57] ABSTRACT

A fuel injection system employing digital logic to generate injection command pulses of a time duration calculated to provide a precise quantity of fuel to meet presently existing, varying engine requirements is disclosed herein. The system employs a first or injector selection circuit operative to select an injector or injector group for injection and a second or adaptive delay circuit to generate an injection command. The circuits are electronically intercoupled to provide for substantially simultaneous application of the selection pulse and injection pulse to the proper injector group and to eliminate the need for a mechanical distributor arrangement to select the proper injector group. The time duration or delay signal is generated by a function generator producing an output as a known function of time with injection occurring during the time it takes for the output to reach a pre-determined, selected, threshold value. In order to compensate for varying supply voltages, the second circuit includes means for providing automatic voltage compensation.

30 Claims, 7 Drawing Figures

FUEL INJECTION SYSTEM

Matter enclosed in heavy brackets [ ] appears in the original patent but forms no part of this reissue specification; matter printed in italics indicates the additions made by reissue.

This [application is a continuation of ] *is a continuation of U.S. patent. application Ser. No. 457,148, filed Apr. 1, 1974, now abandoned, which is a reissue application of Ser. No. 144,268, filed May 17, 1971 and became U.S. Pat. No. 3,763,833, and a continuation-in-part of U.S. application* Ser. No. 815,800, filed April 14, 1969, and now abandoned.

SUMMARY OF THE INVENTION

The state-of-the-art fuel injection for internal combustion engines utilizes hydro-mechanical systems and electronic systems which present highly complex and sophisticated methods of delivering precisely metered quantities of fuel to the combustion chambers. The present invention is primarily concerned with the electronic system in which an electromechanical injector valve is controlled by an electronic circuit in which a signal is generated indicative of a time duration for which said valve must be open to allow fuel at a known pumping pressure to enter the cylinder to provide complete combustion without wastage or lack of fuel. The prior art electronic systems have incorporated a monostable multivibrator, in any one of its known forms, which is switched to its unstable state at a point in time related to the engine cranking angle and which is caused or allowed to remain in that state for a period of time representative of the time the electromechanical injector valve must be open.

While this (monostable multivibrator) type of control circuit has generally performed adequately from both engine performance and exhaust emissions control view points and has experienced commercial success on small 4-cylinder engines, the system has been hampered by the size, complexity and cost required to adapt and apply it to larger engine sizes which are currently the standard for domestic United States manufacture. With the current trend to even larger engines, this problem is aggravated. The area of difficulty with the multivibrator control systems centers about the impedance time delay feedback network required for multivibrators. These networks use, for instance, resistance and capacitance such that the time required to charge, or discharge, the capacitor to a predetermined value establishes the time delay. These systems usually employ a variable impedance which may be variable resistor and/or a variable capacitor and/or a variable inductor in order to achieve the wide flexibility of delay required between maximum and minimum engine demands. Of course, it would be equally possible to use a fixed impedance and to vary the current or voltage applied thereto.

The variable impedance time delay feedback network requires either a large resistor or a large capacitor or inductor to provide the necessary time constant. However, a large resistance reduces the current capacity of the feedback network making switching of the multivibrator difficult, if not impossible. It is, therefore, most practical to provide a large capacitor or inductor. While this provides a suitable time constant for the feedback network, it also results in a situation requiring relatively long "off" time so that the energy accumulated (or lost, as the case may be) by the capacitor or inductor may be discharged (or accumulated) preparatory to the start of the next operating cycle. It is, therefore, an object of the present invention to provide a time signal generating means for the control of fuel injection which does not relay upon feedback switching. More specifically, it is an object of the present invention to perform the switching function independently of the time based signal generating means so that the signal or function generator may be designed to have a minimum reset time. It is a still further object of the present invention to provide, as separate circuits, a circuit for generating a signal indicative of elapsed time and a circuit for detecting a desired signal, representative of a desired time delay and causing a switching as indicative that the desired time delay has occurred.

Because multivibrators are oscillators whose feedback provides them with a specific number of stable and unstable states, they require a specific "off" or inactive time related to the "on" or active time. By "active" and "inactive" time is meant the time when the oscillator is in the necessary state to perform the function desired (i.e. injection time command signal generation) and the time when the oscillator is in another state. This tends to place an upper limit on the speed of the injected engine, since for increasing engine speed and increasing injection time a point will be reached where injection time plus inactive or "off" time exceeds the time available in the engine operating cycle. It is, therefore, an object of this invention to provide a system having fast recovery time which will permit an increase in the available injection time at any given engine operating speed. More specifically, it is an object of this invention to provide a means for controlling fuel injection which does not depend on an oscillator to generate a time duration controlled injection signal or command. It is a further object of this invention to provide a time duration signal generating means which relies upon means, other than a variable impedance feedback signal in an oscillator, to generate the injection signal of variable time duration. It is a still further object of my invention to employ a bootstrapping circuit with a threshold detector in a fuel injection control circuit as the source of the variable injection time duration control.

In systems which employ a storage battery for the source of power, it becomes important to vary the time duration signal to compensate for variations in the voltage applied to the electro-mechanical injector valves. The known systems sense the available supply voltage and directly vary the time delay accordingly. It is an object of this invention to provide a time delay circuit means in which voltage correction is automatically provided by the arrangement of the circuit elements. It is a still further object of this invention to provide an electronic fuel injection system which does not require an electronic oscillator to generate an injection time duration signal and which has automatic voltage correction. It is also an object of this invention to control injection so that injection occurs during the coincidence of two control signals one of which is time duration controlled by the time required for a signal function generator, producing an output signal which is a known unique function of time, to produce an output signal of a selected value such that the time required to reach the selected value corresponds to the requisite injection time. Specifically, it is an object of this invention to provide in a fuel injection system electronic control of the injector valve open time in which the rate of charging of a low valued reactance controls the output characteristic of a signal generated by an adaptive delay means. More specifically, it is an object of this invention to provide a logical control circuitry for fuel injection systems in which a reactive means controls the rate of increase of a signal produced by a function generator having fixed maximum and mimimum values to provide automatic voltage compensation for an adaptive means in an electronic fuel injection system. It is a still further object of this invention to provide a fuel injection system in which switching logic in conjunction with a self-compensating adaptive delay means selects and controls injector valve means.

The present generation of fuel injection controls represents state-of-the-art discrete component transistor and vacuum tube technology and as such it is believed to be most inappropriate for direct translation into the field of the more reliable integrated circuit technology. The reasoning behind this is that with integrated circuitry the cost of fabrication of the circuit is proportional to the surface area of the individual elements. With the earlier discrete component electronic circuit designs, the cost of the active elements greatly exceeded the cost of the passive elements. This dictated a design philosophy in which circuits were designed with a minimum of active elements and passive elements were used wherever possible. With integrated circuits on the other hand, a totally different design philosophy must be used in which passive elements are minimized since resistors and capacitors require substantially larger surface areas than do transistors and diodes. The prior art control systems were designed around the discrete component philosophy and, therefore, do not in general, conform to the present circuit design philosophy. It is, therefore, an object of the present invention to provide a control circuit, adapted for fuel injection control, which conforms to the present philosophy of integrated circuit design so that presently available integrated circuitry technology may be used for appropriate portions of the control system. Specifically, with the above object in mind, it is an object of the present invention to provide a circuit in which the total number of resistors and capacitors is reduced and values of resistance and capacitance are and can be kept low.

DETAILED DESCRIPTION OF THE DRAWING

Figure 1:
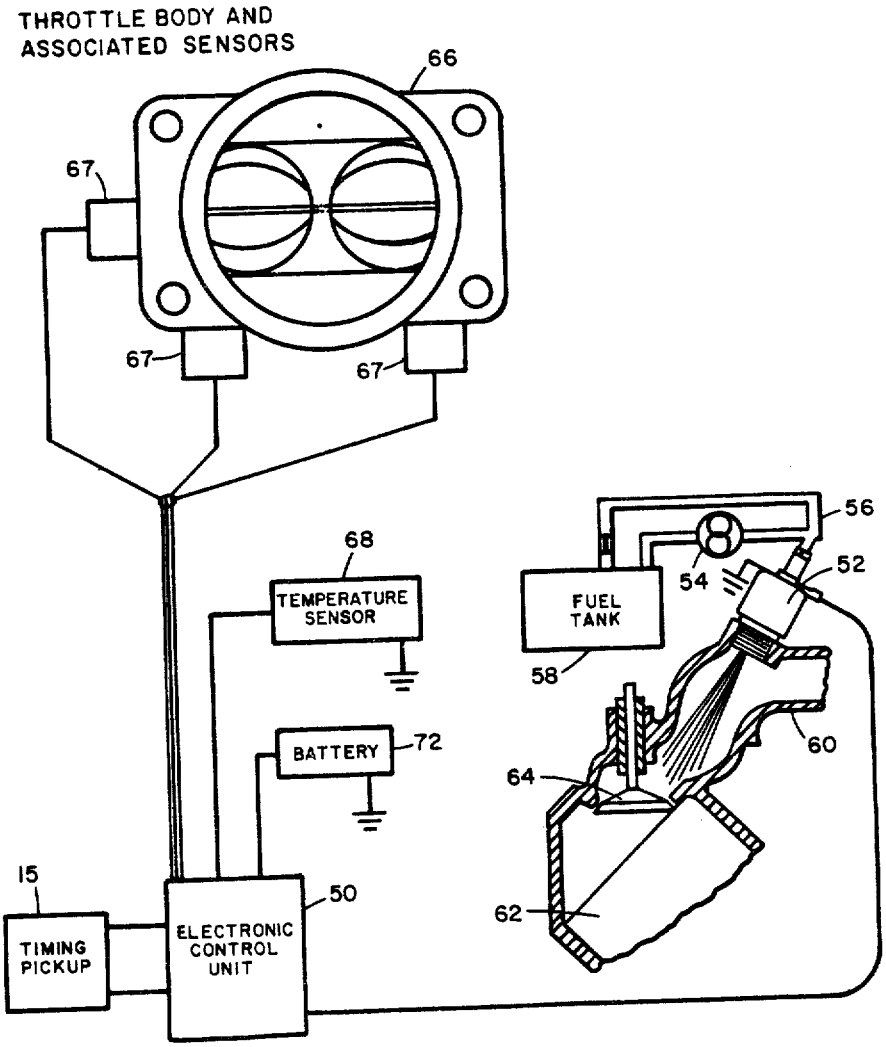
FIG. 1 shows a schematic of how the control system of the present invention could be applied to an automobile engine.

Referring now to FIG. 1, my invention is shown as it would apply schematically to the fuel supply system of an internal combustion engine. The electronic control unit 50 contains the logic network as illustrated in FIGS. 2, 4, 5 and 6 for controlling an electromechanical type injector valve 52. Fuel is supplied to the valve 52 by pump means 54 and conduit means 56 from fuel tank 58. The valve 52, when open as illustrated, permits fuel, pressurized to a predetermined pressure, to be injected into the intake manifold 60 from whence it is drawn into the combustion chamber 62 of an engine, not shown, through the open intake valve 64. While the valve 52 is illustrated as being in the intake manifold 60, it could also be located in the engine block, not shown, or at any suitable location upstream from the intake valve 52.

Air is provided to complete the combustion mixture through throttle body 66 which communicates with the intake manifold 60. Connected to the throttle body 66 are various parameter sensors designated generally by 67 which provide information in the form of electrical inputs to the electronic control unit 50 to controllably vary injector open time and thereby control the amount of fuel injected. These sensors may, for example, sense absolute manifold pressure, the need for full load or acceleration enrichment or the need for cold start enrighment. While three sensors are illustrated associated with the throttle body, more could be provided at the throttle body or those shown could in the alternative be located elsewhere, as for instance, on the intake manifold.

Temperature sensor 68 and timing pick-up 15 provide further data for the electronic control unit 50 which is powered by the supply means, shown here as battery 72. The temperature sensor 68 is used to provide information on the engine temperature and the timing pick-up 15 is used to provide input data on the specific cranking angle of the engine. For this purpose, the distributor may be used as may any source of an electrical signal which is representative of engine crank angle.

Figure 2:
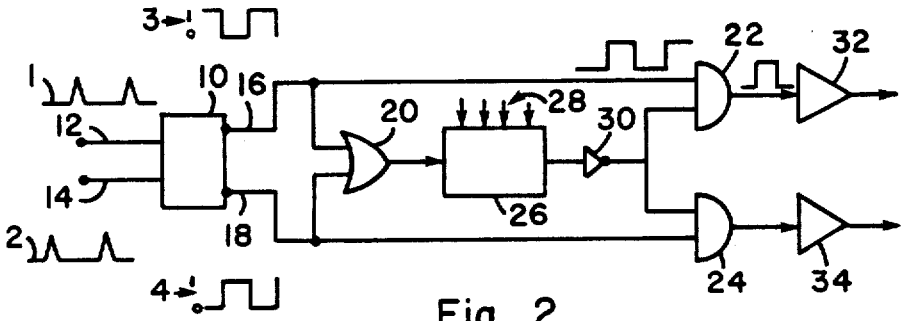
FIG. 2 shows the control circuit, in logic schematic form, of the present invention.

The logic diagram shown in FIG. 2 illustrates the present invention in a non-particularized manner as applied to two-group injection. In FIG. 2, there is shown a switching device 10 capable of producing alternating output signals and receiving as input a signal or signals representative of engine crank angle. Mechanically, this could be single lobed cam, driven by the engine and alternately opening and closing a pair of contacts. Since this arrangement could generate spurious signals, as by contact bounce, the switching device 10 will be described and discussed as a flip flop since the flip flop is known to produce a substantially constant level of output at one output location and zero level at the other output location in response to a triggering signal which need only be a spike input but may also be of longer duration and a flip flop may be readily made insensitive to other types of signals. Traces 1 and 2 illustrate the alternating triggering input signals while traces 3 and 4 illustrate the time relationship of the two output signals. Signals received on the non-triggering input will, of course, have no effect on a flip flop. Outputs 16 and 18 are connected to the inputs of a logic gate 20. Gate 20 is arranged to give a relatively short duration pulse whenever the flip flop 10 changes state and to produce a constant level DC output at all other times. Outputs 16 and 18 are also connected to the inputs of a pair of AND gates with output 16 being connected to one input of AND gate 22 and the output 18 being connected to one input of AND gate 24. The output of the gate 20 is connected to the input of an adaptive delay means 26 which receives, as control inputs, signals from the various engine parameter sensors, as at 28 indicative of engine operating conditions and, therefore, of the engine fuel requirement. The output of the adaptive delay means 26 is fed through an inverter 30 and the output of the inverter 30 is connected to a second input of each AND gate 22 and 24. The output of AND gate 22 is connected to amplifier 32 which, in turn, supplies controlling current to the first injector group. AND gate 24 is connected to amplifier 34 which supplies controlling current to the second injector group.

As will be readily apparent, the presence of an output signal from the flip flop 10 will occur at one output location to the exclusion of the other. This signal will then appear at one input of only one AND gate of only one amplifier. This signal selectively designates an injector or injector group for imminent injection. For the sake of example, we shall assume that the output signal of the flip flop 10 is at output location 16 so that the signal also appears at one input of AND gate 22. The signal from the output 16 of the flip flop 10 also appears at one input of the gate 20 where, assuming the flip flop 10 has just changed state, a short duration signal is passed to the adaptive delay means 26. The adaptive delay means 26 is operative to produce an output after the passage of a predetermined amount of time. The time is determined by the values of the various sensory inputs applied at 28 to the adaptive delay 26. During this initial period of time when the output of the adaptive delay 26 is zero, the inverter 30 is producing a full-strength output signal. This signal is applied to one input of each of the AND gates 22 and 24. Because of the intrinsic nature of AND gates, an output signal is produced only while an input signal is being applied to each and every input. This then dictates that AND gate 22 will produce an output to be amplified by amplifier 32 to open the first injector group since it is receiving an injector selection command directly from the flip flop 10 and an injector control command from the inverter 30. At the end of the time delay period, adaptive delay means 26 produces a signal which is then inverted from a positive signal to a zero level signal by the inverter 30 so that the injection control command output signal of the inverter 30 is removed from the input to the AND gate 22 and the output of the AND gate 22 goes to zero thereby allowing the first injector group to close. During the period of time the first injector group is open, a metered amount of fuel under pressure is injected by the first injector group.

Figure 3:
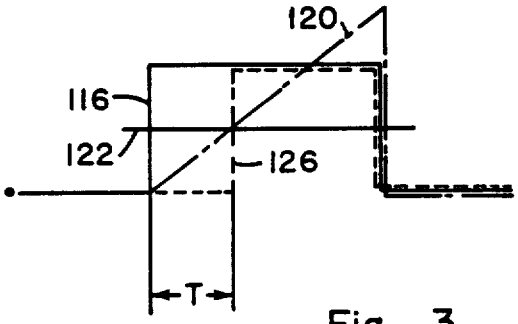
FIG. 3 shows, superimposed, the signal wave forms for the input signal, adaptive delay signal and output signal of one type of circuit constructed in accordance with the logic diagram of FIG. 2.

Referring now to FIG. 3, three signal wave-forms are shown. The input step 116 represents the signal present at the output 16 of the flip flop 10 under the conditions assumed above. The output step 126 represents the output signal of the adaptive delay means 26. Ramp signal 120 represents the signal generated by the function generator portion of the adaptive delay means 26 according to the FIG. 4 embodiment. The ramp is started at some fixed value, which may be zero or some positive value at a small fraction of the maximum at the start of the input signal 116 and increases at a uniform rate whose instantaneous value is a function of time. The level indicated as the threshold 122 represents the output value which the ramp will attain after a period of time, t, equal to the desired delay. In order to vary the time delay and thus to arrive at the desired pulse width, it is merely necessary to vary the value of the threshold 122 for a ramp having a predetermined constant rate of increase or alternatively, the rate of increase may be varied for a threshold of constant value, or both the rate of increase and the threshold values could be varied.

Figure 4:
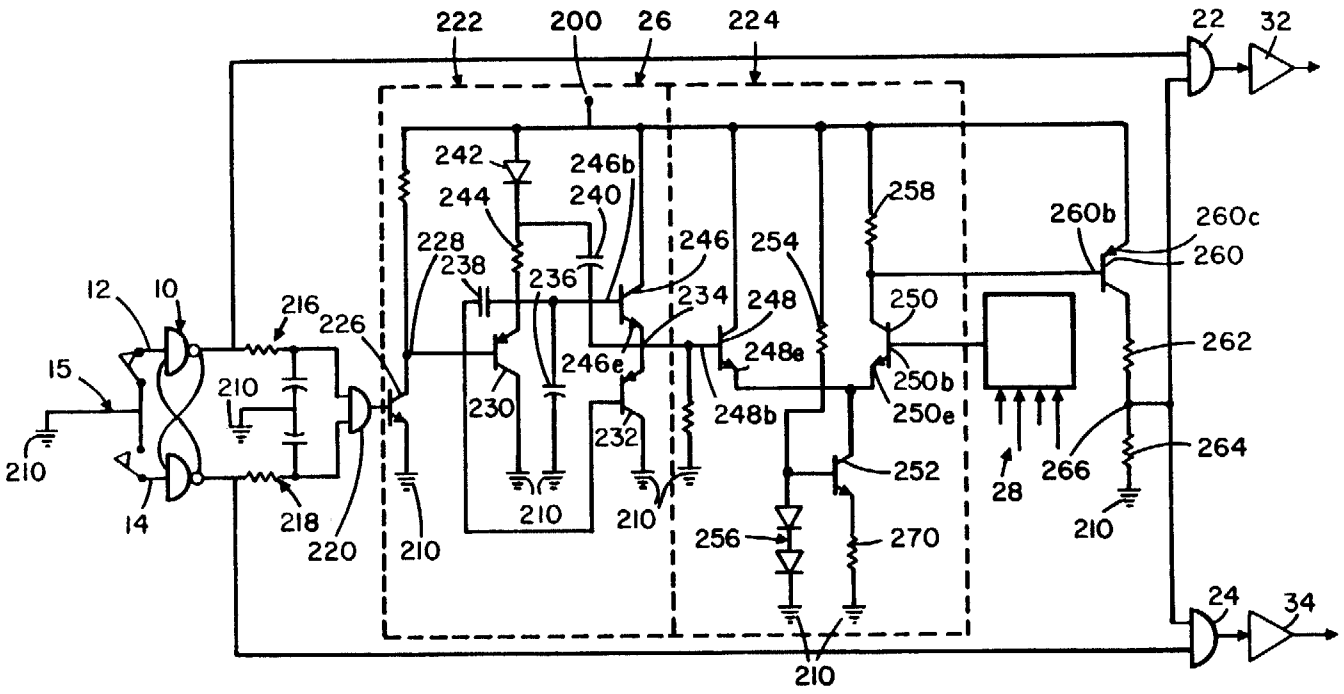
FIG. 4 shows, in a preferred embodiment, an electronic circuit realization of the logic circuit of FIG. 2, employing AND-NAND logic.

FIG. 4 illustrates the preferred embodiment of my invention as applied to two group injection and realized as an electronic circuit having AND-NAND logic elements. In this embodiment, those components or subsystems which directly correspond to the FIG. 2 logic circuit are designated by the same numerals. Power for this configuration is supplied by a voltage source or supply, not shown, with one terminal connected to circuit location 200 and the other terminal connected to the common or ground point 210.

The flip flop has two triggering inputs, 12 and 14, which are connected to a source of electrical pulses, indicated generally as 15, which source is indicative of engine cranking angle and the inputs are connected to points which indicate crank angles substantially 180° apart. While my invention is illustrated, with respect to an engine whose combustion chambers are supplied with fuel through group injection and I choose to inject in two groups, it should be evident from FIG. 6 discussed hereinbelow, that the selection of two triggering points electrically substantially 180° out of phase is of importance in the practice of my invention only to the extent the total available injection time for both injection groups be substantially equal.

The delay means 216 and 218 are connected to the inputs of AND gate 220 and are operative to produce input pulses for a brief period on both input leads immediately after the flip flop 10 has changed state. The delay means 216 and 218 are shown as resistive/capacitive networks but may be any network capable of causing a slight delay and signal overlap. Therefore, whenever the flip flop 10 changes state, the AND gate 220 produces a short duration output pulse which is operative to reset the adaptive delay means indicated generally as 26.

Adaptive delay 26 is comprised of two states, a function generator indicated generally as 222 and a voltage threshold detector indicated generally as 224. The function generator 222 includes resetting means operative to reset the function generator. When AND gate 220 receives an input signal at both of its inputs, it produces an output pulse which acts as a resetting pulse. This pulse drives transistor 226 into conduction causing circuit point 228 to assume a voltage level at or very near the value of the common or ground voltage. The bases of transistors 230 and 232 are coupled to circuit point 228 so that when the voltage at this point goes from the supply voltage to ground, transistors 230 and 232 are also driven into conduction. Conduction of transistor 232 causes circuit point 234 to assume a near-ground potential while conduction of transistor 230 permits capacitor 236 to partially discharge and capacitor 238 to fully discharge. When circuit point 234 assumes a near-ground potential, capacitor 240 is permitted to charge up so that it displays nearly the full supply voltage across itself.

At the end of the output pulse from the AND gate 220, transistors 226, 230 and 232 are turned off. Furthermore, the voltage drop across diode means 242 becomes zero and capacitor 240 begins to discharge through resistor 244 thereby charging capacitor 236 at a nearly constant rate. As soon as capacitor 236 has charged up to the desired value near the supply voltage, transistor 246 is driven into saturation.

Transistor 246 is connected in an emitter follower configuration so that the voltage at the emitter 246e, which is connected to circuit point 234, "follows" the voltage at the input or base 246b of the transistor 246. Upon initiation of the reset pulse at the output of AND gate 220, transistor 246 turns on as a result of a steep voltage wave front present at circuit point 228 feeding through capacitor 238 and passing into the base of transistor 246. The voltage at the circuit point 234 jumps to a predetermined, low voltage on the order of, for example, 1 volt as a result of the capacitive voltage division of capacitors 236 and 238 and the collector to emitter saturation voltage of transistor 230.

It will be observed that the capacitor 240 interconnects circuit point 234 and one side of resistor 244. As is well known, the voltage across a capacitor cannot change instantaneously so that when the voltage at circuit point 234 goes from ground (or very near ground) to some higher value, the potential on the one side of resistor 244 increases a like amount. The voltage at this point then becomes higher than the supply voltage and diode means 242 is reverse-biased which causes current flow therethrough to cease. Capacitor 240 then proceeds to transfer some of its charge through resistor 244 and into capacitor 236. As capacitor 236 collects charge, its potential increases, causing circuit point 234 to exhibit a similar increase. The potential at circuit poing 234 increases in a smooth, continuous fashion until it reaches a value slightly less than the supply value. Circuit point 234 provides the output of the function generator portion of the adaptive delay means with a voltage value that "bootstraps" itself from a near-ground value to a near-supply value.

As the supply voltage varies during its operating and/or life cycle, the voltage impressed upon capacitor 240 varies. In this embodiment, capacitor 240 influences both the maximum voltage at circuit point 234 and the rate of voltage increase at capacitor 236. The instantaneous charge on capacitor 236 is directly related to the voltage level to which the capacitor 240 was charged during the previous reset cycle. Capacitor 236 and resistor 244 control the rate of bootstrapping so that the bootstrapping rate is directly proportional to the supply voltage. FOr any given threshold value, the time, t, that it takes of the function generator portion of the adaptive delay means to generate a function equivalent to the threshold value will, therefore, automatically vary in direct relation to the variations in the supply voltage. The injection time duration command will, as a consequence, include a small increment to compensate for sluggish injector response due to the low voltage of the supply and, in the case of high voltage and rapid response, the command will be accordingly shortened. Because the voltage at circuit point 234 follows the voltage at the base 246b of the transistor 246, and this is controlled by the charging rate of capacitor 236 whose charging rate is controlled by capacitor 240 which will be charged to the supply value less a fixed value dependent upon the number of p-n junctions in diode means 242 between it and the supply, the bootstrapping rate will vary as the supply varies, thereby inversely varying the time, t. However, since capacitor 236 behaves only as a voltage level establishing means and capacitor 240 is available as a current source, capacitor 236 may be made quite small and its discharge time and, therefore, the reset time for the adaptive delay means 26 can be maintained at a very low amount. In the preferred electronic embodiment shown in FIG. 4, the function generator comprises a ramp generator. That is, the voltage at circuit point 234 increases substantially linearly from a low initial value to a value approximately that of the supply voltage 200 less a fixed amount. However, in the FIG. 5 embodiment, discussed hereinbelow, the function generator is a series R-C combination wherein the function sensed by the threshold detector is the charging of the capacitor.

The next stage, the threshold detector 224 is comprised of the detecting means which, in this instance, is an emitter coupled pair of transistors 248 and 250 and a means for causing rapid switching. The emitters 248e and 250e are connected to the rapid switching means which, in this instance, is a constant current source which is comprised of transistor 252 which is permanently forward biased by current flow through resistor 254 and diode means 256. The current which is fixed by transistor 252 flows through either transistor 248 or transistor 250 depending upon which transistor base connection 248b or 250b is residing at a higher potential. Base 250b is normally at some high potential representative of engine conditions and, therefore, during the initial operation of the function generator 22, is at a higher level than that attained by the function generator 222 at circuit point 234. This, therefore, requires that the current flow through transistor 250. When the level attained by the function generator at circuit point 234 (and, therefore, at base 248b) exceeds the level at base 250b the current is switched to transistor 248 as a result of regeneration at emitter 248e and 250e. In turn, regeneration is speeded and aided by the rapid switching means. The control voltage, that is the voltage at base 250b of transistor 250 is controlled by the various engine parameter sensors, as at 28, and may comprise the output of a suitably controlled and interconnected voltage divider network.

Transistor 260, along with resistors 262 and 264, constitutes the inverter means 30. When transistor 260 is conducting, there is a voltage drop across resistor 262 and circuit point 266 is, therefore, at some positive potential. Circuit point 266 is connected to an input of each of the AND gates 22 and 24 so that a signal is present at each AND gate whenever transistor 260 is conducting. However, an AND gate requires a signal to be present on each of its inputs before an output is realized so that only the AND gate which has been suitably prepared, that is by receiving a signal from the inverter means 30 and flip flop 10, will generate an inject command to its associated injector amplifier means.

As a consequence of the switching of current flow at the emitter coupled pair, transistor 260 turns off and terminates current flow through resistors 262 and 264. The voltage at circuit point 266 drops to the common or ground level and the time duration controlled or injector control command signal to the inputs of AND gates 22 and 24 is ended. This terminates the injection command and the injector valves are de-energized. Upon the next change-of-state of the flip flop 10, the process will be repeated for the next injector group.

Figure 5:
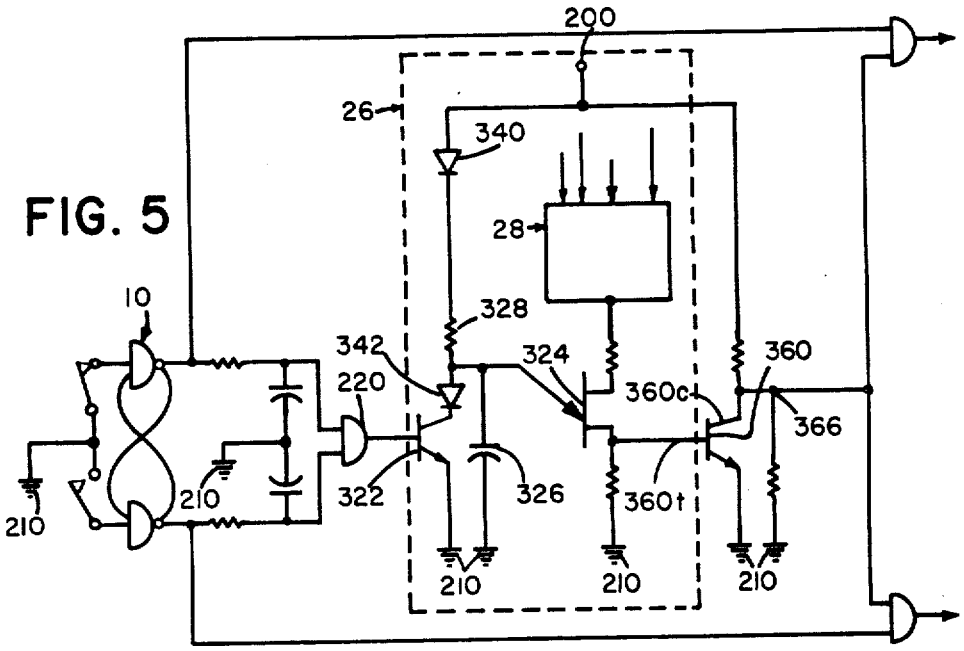
FIG. 5 shows an alternative realization of the adaptive delay portion of the electronic circuit of the FIG. 4 embodiment.

Referring now to FIG. 5, an alternative embodiment of my invention is shown in which the adaptive delay means 26 is comprised of a threshold detector in the form of a unijunction transistor wherein the inter-base voltage is varied by the engine parameter sensors 28 to set the desired time delay for the turn-on of transistor 360, and a function generator consisting of a resistive-reactive network comprised in this instance of capacitor 326 and resistor 328.

Briefly, operation is as follows: an AND gate 220 output pulse resets the circuit by turning on transistor 322 and discharging capacitor 326. This causes the unijunction transistor 324 to be turned off and transistor 360 is also turned off. When transistor 322 is turned off by the logical zero from AND gate 220, capacitor 326 begins to charge through resistor 328 which is connected to the supply voltage. A voltage dependent upon the engine parameters across the bases of the unijunction transistor 324. When the charge on the capacitor 326 is sufficient to cause the voltage across the capacitor to equal the interbase voltage of the unijunction transistor 324, the unijunction 324 will begin to conduct and the voltage on the base 360b of transistor 360 will rise to some value sufficient for forward bias. This will cause the collector 360c and consequently, circuit point 366 to assume a potential very near to the ground potential which terminates the controlled pulse or delay signal to the AND gate gates and injection is terminated. Diode means 340 and 342 are operative to control the maximum and minimum charge accumulated on capacitor 326. This then operates as an alternative form of the automatic voltage compensation means.

Figure 6:
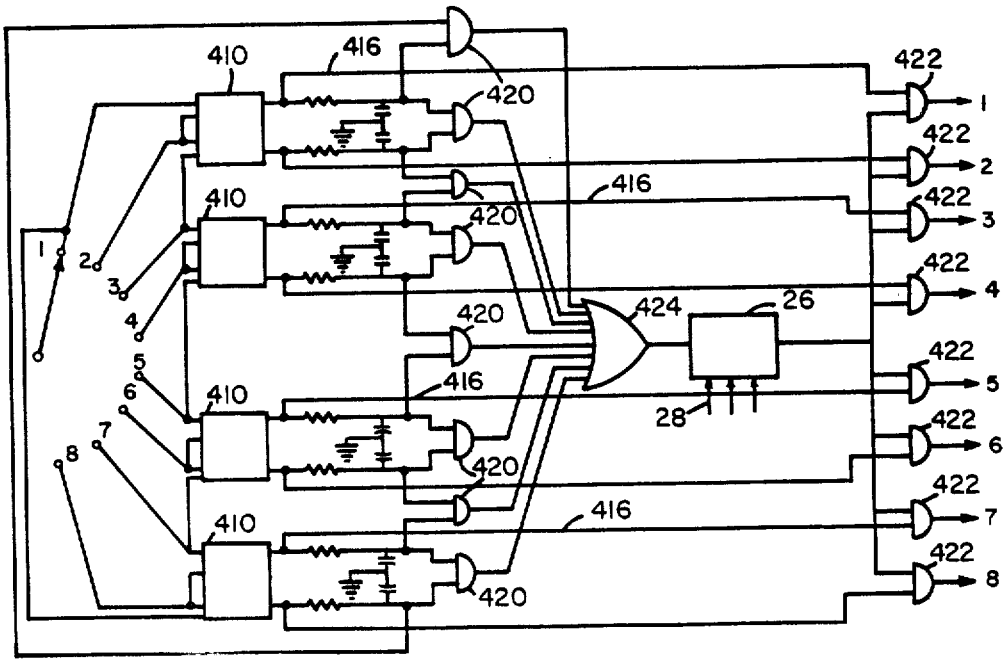
FIG. 6 shows a schematic circuit diagram of an embodiment of the present invention as applied to 8-cylinder serial injection.

Referring now to FIG. 6, my invention is applied to an 8-cylinder serial injection system. In this embodiment, each cylinder has its own AND gate indicated generally as 422, and its own input flip flop, indicated generally as 410, and its own delay means indicated generally as 416. AND gates 420 interconnect the delay means 416 to generate a signal whenever the switch means 415 moves from one contact to the next. The output of the AND gates trigger an OR gate 424 with the output of the OR gate 424 initiating the reset and time delay generation of the adaptive delay means 26 which receives engine parameter sensory inputs as at 28. The flip flops 410 are intercoupled so that only one AND gate 422 is receiving an injector selection pulse at any one time. Systems which employ serial injection may inject upstream of the intake valve, through the intake valve while it is open, or directly into the combustion chamber.

Figure 7:
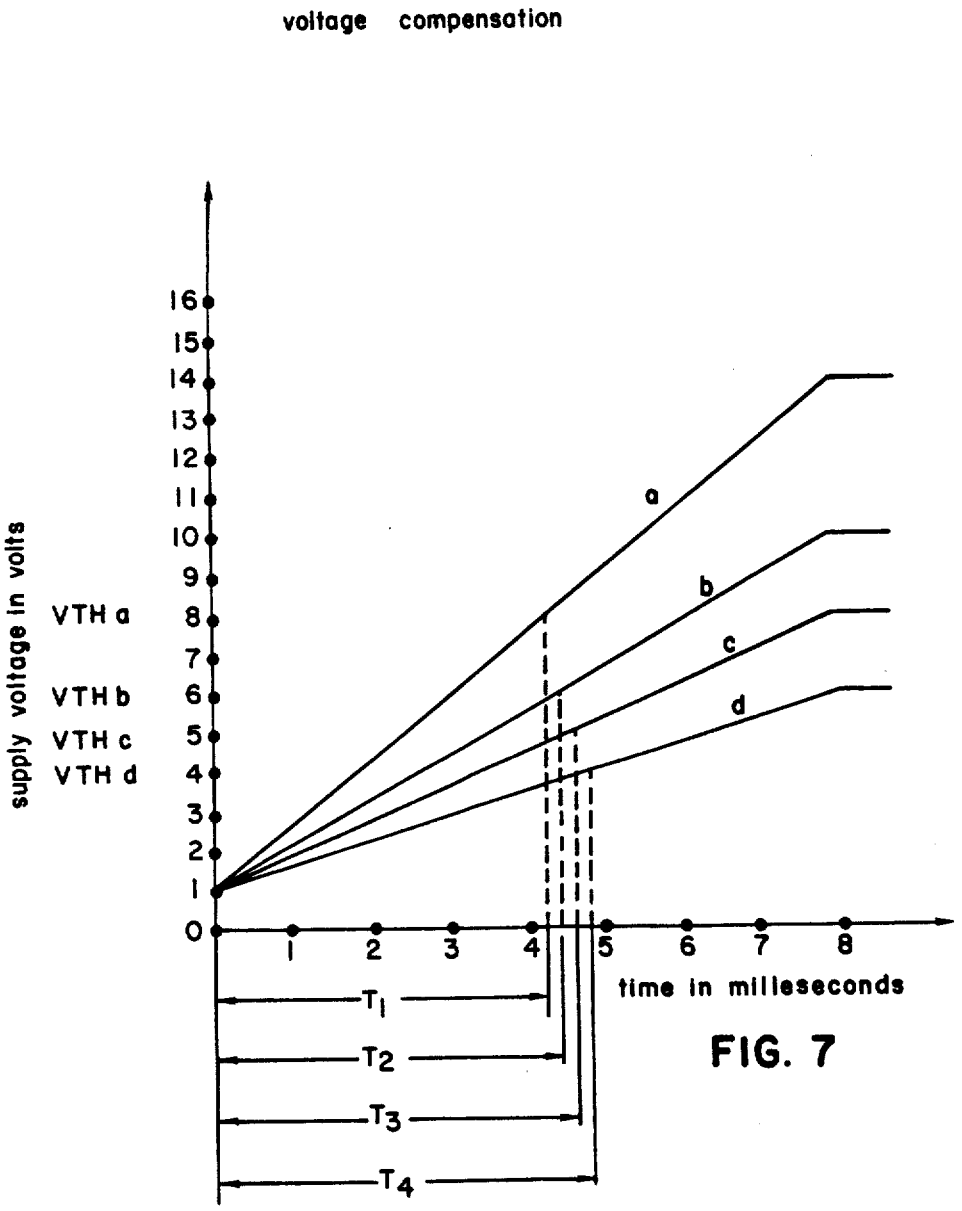
FIG. 7 shows a graph illustrative of the voltage compensation automatically achieved by the present invention.

Referring now to FIG. 7, a graph of the voltage at the output of the function generator is shown to illustrate the voltage compensation feature of the FIG. 4 embodiment. The graph of FIG. 7 shows a ramp output signal but the voltage compensation does not depend upon the particular function being generated. Four ramps a,b,c,d are shown starting at a common value, which is, for the sake of illustration, 1 volt. However, depending on the value of the supply voltage, the maximum voltage which a particular ramp may rise to is a constant value less than the supply. Again for the sake of illustration, this value is taken to be 2 volts. The starting and maximum values for the ramp function are insensitive to supply variations since the former case, the the value is controlled by the saturation voltage of a particular transistor and in the latter case by the number of p-n junctions interposed between the output of the function generator and the supply. Since the ramp function total rise time is dependent upon the impedances in the function generator network, this value will be constant.

Ramp "a" illustrates the situation where the supply voltage is 16 volts and the threshold valve is one-half of the supply voltage. The time it takes for the ramp to reach the threshold value is then $t_1$. For operating conditions requiring that identical quantities of fuel be injected but with lower supply voltages, (that is "b"-12 volts, "c"-10 volts, and "d"-8 volts) the curves, "B", "c" and "d", illustrate the ramp function generated to provide the increased injection time required to compensate for slower injector valve response. In each case, the initial value of the curve is the same and the final value is a fixed increment below the supply value with total rise time remaining constant. The threshold value, $V_{th}$, in each case is the same fraction of the supply voltage indicative of identical fuel requirements for the four curves. The amount of compensation is, of course, tailorable in any system by altering or varying the two fixed increments which control the starting and ending values for the generated function.

The man skilled in the art will recognize that many modifications and variations may be made in the described embodiment without departing from the spirit of the invention as described in the appended claims. For instance, the AND gate means could be replaced with a bistable gate which is triggered by the change of state of the input switching means and the switching of the threshold detection means to permit injection during the period subsequent to the change of state of the input switching means.

I claim:

1. In a fuel control system for an internal combustion engine of the type having fuel injector valve means and a means to sense engine crank angle, the combination comprising:

generating means responsive to engine crank angle to generate a first signal having a waveform with leading and trailing transitions said transistions being indicative of the occurrence of at least one selected engine crank angle;

adaptive delay means responsive to said first signal waveform operative to generate a second signal having a waveform with leading and trailing transitions and including means operative to delay in time the leading transitions of said second signal waveform relative to the leading transitions of said first signal waveform by a predeterminable variable amount which is dependent upon engine speed and load;

inverter means responsive to said second signal operative to generate a third signal having a waveform with leading and trailing transitions corresponding to the trailing and leading transitions, respectively, of said second signal waveform whereby said second signal waveform is inverted to produce said third signal waveform;

gating means receiving said first and third signal waveforms and operative to produce an output signal having a waveform with leading and trailing transitions, which waveform is produced only when said first and third signal waveforms overlap in time; and injector control means responsive to said output signal to energize at least one injector valve means during the time interval between two consecutive output signal waveform transitions.

2. The system as claimed in claim 1 wherein said adaptive delay means comprise:

function generator means operative to generate a signal having a characteristic which varies with elapsed time from a first value indicative of a selected engine crank angle to a second value; and threshold detector means operative to produce a signal having a first level and a second level and operative to switch therebetween whenever said function generator means signal passes through a predeterminable threshold level intermediate said first and second values.

3. The system as claimed in claim 2 including further rapid switching means coupled to said detector means operative to facilitate rapid switching of said detector means signal between said first and second levels.

4. The system as claimed in claim 3 wherein said detector means comprise an emitter-coupled pair of transistors, each of said transistors having a base electrode and an emitter electrode, one of said base electrodes arranged to receive said function generator means signal and the other of said base electrodes arranged to receive a reference signal and said rapid switching means comprise a constant current source in series relationship with said emitters.

5. In a fuel injection system for an internal combustion engine having fuel injection valve means, control means to generate a signal indicative of engine fuel requirements and input signal generating means operative to generate a first signal waveform having leading and trailing transitions, the improvement to said control means comprising:

adaptive delay means operative to receive said first signal and to produce, as output, a delay signal having a waveform with a leading transition produced in response to the leading transition of said first signal waveform but delayed in time relative thereto by a predeterminable variable amount dependent upon engine operating parameters;

inverter means operative to receive said delayed signal and to produce in response thereto an inverted output signal having a waveform with a trailing transition corresponding to the leading transition of said delayed signal waveform; and gating means operative to receive said first signal and said inverted signal and to produce an output signal having a waveform with leading transitions corresponding to said first signal waveform leading transitions and trailing transitions corresponding to said inverted signal waveform trailing transitions.

6. The system as claimed in claim 5 wherein said adaptive delay means comprise:

generator means for generating a signal having a characteristic which varies with elapsed time in a predeterminable manner from a first predetermined value to a second predetermined value; and detector means operative to receive said generator means signal and to produce an output signal waveform having transitions which correspond to the generator means signal characteristic passing through a third value intermediate said first and second values;

said delayed signal variable time delay being determined by the time required for said generator means signal to vary from said first value to said third value.

7. The system as claimed in claim 6 wherein said generator means comprise electronic means for generating a ramp voltage.

8. The system as claimed in claim 6 wherein said generator means include a resistive-reactive network and said output signal is controlled by the rate of change of a signal present in the reactive portion of said network.

9. The system as claimed in claim 6 wherein said threshold detecting means comprise a controllably variably biased unijunction transistor.

10. The system as claimed in claim 6 wherein said threshold detecting means comprise a controllably variably biased emitter-coupled pair of transistors, each of said transistors having an emitter electrode and a base electrode.

11. The system as claimed in claim 6 including further rapid switching means in series relationship with the emitters of said emitter-coupled pair operative to cause rapid regeneration at the emitters of the emitter-coupled pair of transistors when said generator means output signal reaches a predeterminable value.

12. The system as claimed in claim 11 wherein said rapid switching means comprise a constant current source coupled to the emitters of the emitter-coupled pair of transistors.

13. In a fuel injection system for an internal combustion engine having a plurality of fuel injectors, the combination comprising:

input means operative to generate a first signal having a waveform with leading and trailing transitions, said transitions being indicative of at least one engine crank angle;

adaptive delay means operative to generate a second signal having a waveform with leading and trailing transitions, and including means operative to delay in time the leading transitions of said second signal waveform relative to the leading transitions of said first signal waveform by a predeterminable variable amount which is dependent upon engine speed and load and including further means operative to cause the second signal waveform trailing transitions to occur no later in time than said first signal waveform trailing transitions;

inverter means responsive to said second signal operative to generate a third signal having a waveform with leading and trailing transitions corresponding to the trailing and leading transitions, respectively, of said second signal waveform whereby said second signal waveform is inverted to produce a third signal waveform; and gating means receiving said first and third waveforms and operative to generate an injection command signal for at least one injector whenever said first signal waveform and said third signal waveform overlap in time, said command signal having a waveform with leading and trailing transitions, with the command signal trailing transitions corresponding in time to said third signal trailing transitions.

14. The system as claimed in claim 13 wherein said adaptive delay means comprise:

function generator means operative to generate a signal having a characteristic which varies with elapsed time from a first value indicative of a selected engine crank angle to a second value; and threshold detector means operative to produce a signal having a first level and a second level and operative to switch therebetween whenever said function generator means signal passes through a predeterminable threshold level intermediate said first and second levels.

15. The system as claimed in claim 14 including further rapid switching means coupled to said detector means operative to facilitate rapid switching of said detector means signal between said first and second levels.

16. The system as claimed in claim 15 wherein said detector means comprise an emitter-coupled pair of transistors, each of said transistors having a base electrode and an emitter electrode, one of said base electrodes arranged to receive said function generator means signal and the other of said base electrodes arranged to receive a reference signal and said rapid switching means comprise a constant current source in series relationship with said emitters.

17. In an internal combustion engine fuel control system of the type having fuel injector valve means and a means to sense engine crank angle, the combination comprising:

generating means responsive to engine crank angle to generate a first signal having a waveform with leading and trailing transitions, said transitions being indicative of the occurrence of at least one selected engine crank angle;

sweep generator means responsive to one of said first signal waveform transitions operative to generate a monotonically changing sweep signal having an initial point which corresponds to said one transition;

threshold comparison means responsive to said sweep signal operative to compare said sweep signal with a threshold level and to produce an output signal having a waveform with leading and trailing transitions, said transitions corresponding to sweep signal excursions through said level;

and injector control means receiving said output signal to control the actuation of the injector valve means during the time interval between two consecutive output signal waveform transitions.

18. The system as claimed in claim 17 wherein said sweep signal has a characteristic which varies as a function of engine operating parameters.

19. The system as claimed in claim 17 including further:

threshold establishing means responsive to at least one engine operating parameter operative to establish a reference threshold level; and means to communicate said threshold level to said threshold comparison means.

20. The system as claimed in claim 19 wherein said sweep generator means comprise electronic means for generating a ramp voltage.

21. The system as claimed in claim 19 wherein said sweep generator means include a resistive-reactive network and said threshold comparison means output signal is controlled by the rate of change of a signal present in the reactive portion of said network.

22. The system as claimed in claim 19 wherein said threshold comparison means comprise a controllably variably biased unijunction transistor.

23. In an internal combustion engine fuel control system of the type having fuel injector valve means and a means to sense engine crank angle, the combination comprising:

generating means responsive to engine crank angle to generate a first signal having a waveform with leading and trailing transitions, said transitions being indicative of the occurrence of at least one selected engine crank angle;

sweep generator means responsive to one of said first signal waveform transitions operative to generate a monotonically changing sweep signal having an initial point which corresponds to said one transition;

threshold comparison means responsive to said sweep signal operative to compare said sweep signal with a threshold level and to produce an output signal having a waveform with leading and trailing transitions, said transitions corresponding to sweep signal excursions through said level;

injector control means responsive to said output signal to control the actuation of the injector valve means during the time interval between two consecutive output signal waveform transitions;

threshold establishing means responsive to at least one engine operating parameter operative to establish a reference threshold level;

and means to communicate said threshold level to said threshold comparison means;

said threshold comparison means comprising a controllably variably biased emitter-coupled pair of transistors, each of said transistors having an emitter electrode and a base electrode.

24. The system as claimed in claim 23 including further rapid switching means in series relationship with the emitters of said emitter-coupled pair operative to cause rapid regeneration at the emitters of the emitter-coupled pair of transistors when said generator means output signal reaches a predeterminable value.

25. The system as claimed in claim 24 wherein said rapid switching means comprise a constant current source coupled to the emitters of the emitter-coupled pair of transistors.

26. In an internal combustion engine fuel control system of the type having fuel injector valve means and a means to sense engine crank angle, the combination comprising:

first generating means responsive to the crank angle sensing means operative to generate a first signal having a waveform with leading and trailing transitions, selected transitions having a preselected relationship to at least one selected engine crank angle;

second generating means responsive to said first signal selected transitions operative to generate a second signal having a waveform with leading and trailing transitions, said transitions occurring in timed relationship to the occurrence of said first signal selected transitions;

sweep generator means responsive to one of said second signal waveform transitions operative to generate a monotonically changing sweep signal having an initial point which corresponds to said one transition;

threshold comparison means responsive to said sweep signal operative to compare said sweep signal with a threshold level and to produce an output signal having a waveform with leading and trailing transitions, said transitions corresponding to sweep signal excursions through said level;

and injector control means receiving said output signal to control the actuation of the injector valve means during the time interval between two consecutive output signal waveform transitions.

27. The system as claimed in claim 26 wherein said second signal leading transitions occur in timed relationship to alternate ones of the first signal selected transitions and said second signal trailing transitions occur in timed relationship to the first signal selected transitions which occur intermediate said alternate transitions.

*28. A multivibrator circuit including in combination:*

*comparator means having a reference input, first and second signal inputs, and an output;*

*means for supplying a reference voltage to the reference input of the comparator means;*

*timing capacitor means coupled across the first and second signal inputs of the comparator means at first and second junctions, respectively;*

*means for supplying operating potential;*

*first and second charging circuits coupled between the means for supplying operating potential and the first and second junctions, respectively, and;*

*switch means connected to said first and said second charging circuits for alternatively shunting a portion of the current in one of said charging circuits to provide supplementing current in the other of said charging circuits.*

*29. A circuit for generating a fixed pulse duration comprising:*

*complementary pulse generator means for generating first and second normally complementary signals at respective first and second pulse generator outputs and for switching said complementary signals between first and second substantially constant output levels;*

*logic gate means having first and second gate inputs coupled respectively to said first and second pulse generator outputs operative to provide a logic gate output having a first and second logic levels; and*

*capacitor means coupling said first and second logic gate inputs for causing a predetermined overlap in the magnitudes of said pulse generator outputs by increasing the time required for said pulse generator outputs to switch between said first and second levels;*

*whereby said logic gate means generates one of said first and second output levels only during said predetermined overlap.*

*30. The circuit of claim 29, wherein said logic gate means comprises an AND gate.*

* * * * *